United States Patent Office 2,761,857
Patented Sept. 4, 1956

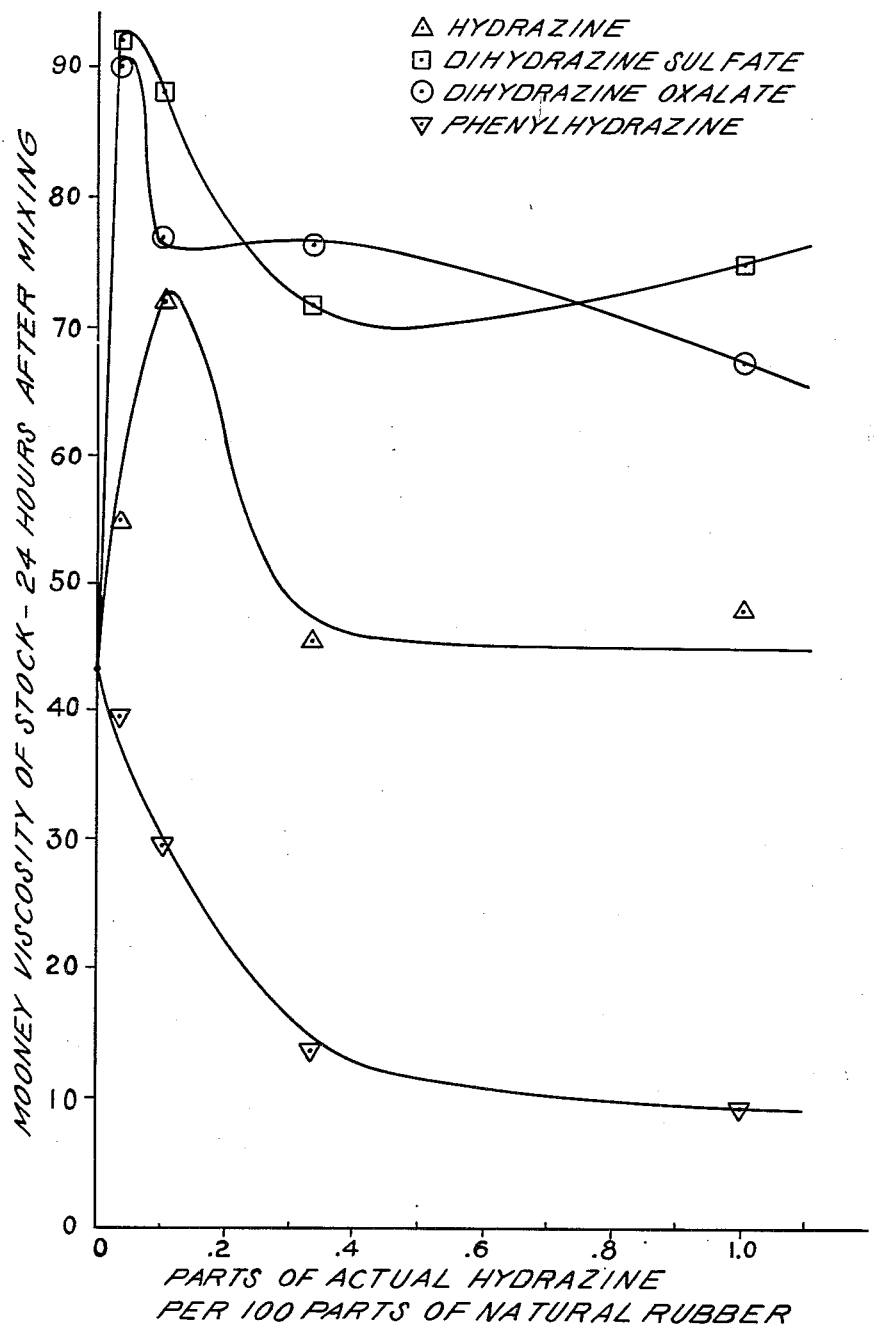

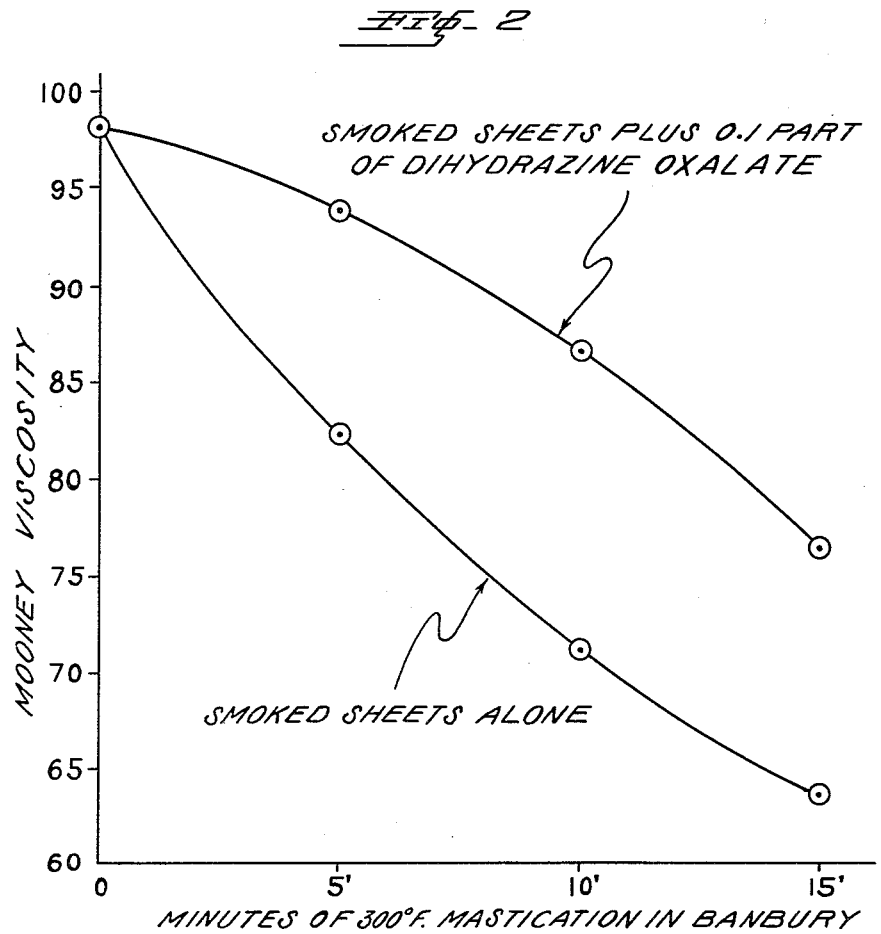

2,761,857

METHOD OF STIFFENING UNVULCANIZED RUBBER

Robert R. Barnhart and Harry D. Glenn, Naugatuck, Conn., assignors to United States Rubber Company, New York, N. Y., a corporation of New Jersey Application April 24, 1953, Serial No. 350,842

3 Claims. (Cl. 260—83.3)

This invention relates to the stiffening of unvulcanized rubber and compositions containing the same.

The art has been confronted with the problem of stiffening unvulcanized rubber compositions in order to improve their manipulation in factory operations. In many operations it is desirable to impart stiffness to an uncured rubber stock by treatment with an extraneous material. The chemicals, p,p'-diaminodiphenylmethane and p-aminophenol, have been used in the past for stiffening uncured rubber stocks but these chemicals are unsatisfactory in many cases because of their discoloring and staining characteristics.

As used herein, the term "stiffening" includes both the imparting of an increased viscosity to an uncured rubber formulation as well as the counteracting of the softening of uncured rubber stocks which normally takes place when such uncured stocks are subjected to continued milling or mastication. In other words, our invention can be used to impart increased viscosity to an existing rubber stock or to reduce the extent of softening of such a stock upon prolonged milling or mastication. Those skilled in the art will appreciate that stiffening chemicals are used in such a way that the over-all effect is that of rendering the stock materially stiffer than it would be if it were prepared in the same way but in the absence of the stiffening chemical.

As is well-known in the art of rubber compounding, it is an easy matter to soften unvulcanized rubber stocks, this usually being effected by merely milling the stocks to the desired lower viscosity. However, it is extremely difficult to reverse the softening process and bring about an increase in the stiffness or viscosity of such stocks. In a given plant operation, for various reasons such as excessive milling or the necessity of re-using large volumes of scrap, the viscosity of a large mass of uncured rubber in process may become lowered too far for commercial utilization. When such a situation arises, one way of remedying it comprises blending the stock of excessively low viscosity with fresh stock of higher hardness; however, this is often out of the question in commercial operation due to the excessive cost and other factors. Therefore there has long been a need for a chemical which would markedly stiffen uncured rubber stocks in a simple and economical manner by simple incorporation with such stocks. To be commercially feasible, such a chemical must not have any adverse effect upon the rubber or the final vulcanizate and must be safe and easy to handle. It should also be effective when used in extremely small proportions so that the cost of using it will not be prohibitively high. It should also be free from discoloration and should not stain light colored material in contact with the cured stock. Our invention meets all of these requirements and provides an extremely simple and satisfactory solution of the problem.

The principal object of the present invention is to provide efficient stiffening agents for natural and synthetic rubbers including neoprene (polychloroprene) and synthetic rubbers containing at least 25% by weight of combined aliphatic conjugated diolefin, e. g., GR–S and butadiene-acrylonitrile rubbery copolymers. The softening of these types of rubber on rubber mills and in internal mixers, e. g., of the type known as Banbury mixers, is necessary for production purposes; however, as is explained above, the uncured rubber mix as prepared often becomes of too low plasticity to be successfully handled in factory operations. The use of a stiffening agent is necessary in such cases to overcome the undesirable low plasticity.

In the accompanying drawings:

Fig. 1 is a graphical comparison of the effect of varying amounts of dihydrazine sulfate, dihydrazine oxalate, anhydrous hydrazine and phenylhydrazine upon the Mooney viscosity of natural rubber. The curves for hydrazine itself and phenylhydrazine are given merely for comparative purposes, since these chemicals are not embraced by our invention, hydrazine being unsatisfactory for many reasons and phenylhydrazine being a softener rather than a stiffener for rubber.

Fig. 2 shows graphically the effect of 0.1 part of dihydrazine oxalate in the milling of natural rubber. The curve is a plot of the data in Example IV below.

The present invention is based upon our discovery that dihydrazine oxalate and dihydrazine sulfate are very effective stiffening agents in unvulcanized rubber compositions. We have found that these salts of hydrazine are particularly effective as stiffening agents when they are used in small concentrations. More specifically we have found that they exert maximum stiffening action per unit of salt when they are used in concentrations ranging from 0.01 to 0.1 part of actual hydrazine content per 100 parts of rubber. The marked effectiveness of such low concentrations of dihydrazine oxalate and sulfate as stiffening agents, coupled with their good physical form and the relative ease and economy with which they can be manufactured, makes their use in rubber processing commercially feasible.

Thus, dihydrazine oxalate and sulfate are valuable to rubber compounders for preventing excessive softness and low viscosity in uncured rubber formulations in process, for example, in the case of stocks embodying reworkable unvulcanized scrap rubber from the operation of cutting parts from calendered sheet. They are also useful for preventing or reducing pressing and marking of stocks in process, for preventing sagging or distortion of extruded uncured rubber goods, and for improving the processing qualities of low grade crude rubbers by toughening and hardening them in the uncured state. At the same time they are completely free from the objectionable staining and discoloring tendencies of the previously used stiffening chemicals mentioned above.

Dihydrazine oxalate is made by reacting two moles of hydrazine with one mole of oxalic acid. It is a white crystalline powder melting at 120–130° C., having a specific gravity of 1.66, having good storage stability, and exhibiting no physiological reactions upon the workers making and handling it. In addition, it disperses readily in uncured rubber stocks. It contains about 41.5% of actual hydrazine.

Dihydrazine sulfate is made in a similar manner by reacting two moles of hydrazine with one mole of sulfuric acid. It is a white crystalline material having good storage stability and exhibiting no physiological reactions upon workers making and handling it. It too disperses readily in uncured rubber stocks. It contains about 39.5% of actual hydrazine. We prefer to market it in admixture with an inert carrier such as talc or clay. The use of such a carrier maintains for an indefinite period the free-flowing characteristics of the material despite the normally deliquescent nature of pure dihydrazine sulfate and is not objectionable because the amount thereof introduced into the rubber stock is so small as to be negligible. Typically we market a mixture of about 26% of dihydrazine sulfate and 74% of inert carrier.

The amount of dihydrazine oxalate or sulfate used is extremely important. If an amount less than that corresponding to 0.01 part of actual hydrazine per 100 parts of rubber is used, the stiffening action produced will not be sufficiently great to be of commercial value. On the other hand, as the amount is increased materially above that corresponding to 0.1 part of actual hydrazine per 100 parts of rubber the stiffening action falls off rapidly so that amounts in excess of those corresponding to 0.1 part of hydrazine are not ordinarily commercially feasible.

Generally speaking, within the above range the stiffening action of the dihydrazine oxalate or sulfate increases as the amount increases, reaching a peak in the neighborhood of, or at a value somewhat below 0.1 part of actual hydrazine content per 100 parts of rubber and then falling off rather sharply although continuing to stiffen to a marked extent at concentrations above 0.1 part of actual hydrazine. Thus the cost for the chemical per unit of stiffening action is lowest in the range of from 0.01 to 0.1 part of actual hydrazine content and usually becomes undesirably high as the 0.1 part figure is exceeded. For this reason and because maximum stiffening is generally attained at not over the 0.1 part figure, we much prefer to operate within the range given above.

Dihydrazine oxalate and sulfate have a slight activating effect on the rate of cure but this is beneficial rather than harmful since excess milling tends to slow curing rates in some rubbers. If desired, this activating or accelerating effect can be offset by the use of a lower concentration of accelerator or by the addition of an acidic material.

In contrast to hydrazine itself, which is a corrosive liquid impractical for use in conventional rubber compounding, dihydrazine oxalate and sulfate are supplied in the form of non-corrosive powdered solids which can be easily shipped, handled, weighed out and incorporated on the rubber mill or in the Banbury mixer using conventional rubber compounding procedure. In addition, as is shown in Fig. 1 of the accompanying drawing and as is discussed more fully below, dihydrazine oxalate and sulfate are better stiffening agents than hydrazine itself at the low concentrations used in the practice of our invention.

In Fig. 1 of the accompanying drawings, there is portrayed graphically the effect of varying amounts of anhydrous hydrazine, dihydrazine sulfate, dihydrazine oxalate and phenylhydrazine upon the Mooney viscosity of natural rubber. In these experiments the selected amount of the chemical the effect of which was to be measured was added to smoked sheet natural rubber after it had been broken down for 3 minutes in a 2B Banbury mixer at 116 R. P. M., and mixing therein was continued for 17 additional minutes. The stock temperature approximated 240° F. At the end of the 17 minute mixing cycle the mix was discharged. The Mooney viscosity was measured immediately after mixing and after a standing period of 24 hours. In Fig. 1 the viscosities after the 24 hour rest period are plotted against concentration of the chemical in terms of actual hydrazine content. The data were as follows:

|  | A | B | C | D | E |
|---|---|---|---|---|---|
| Smoked Sheet | 100.0 | 100.0 | 100.0 | 100.0 | 100.0 |
| Anhydrous Hydrazine | 0 | 0.03 | 0.1 | 0.33 | 1.0 |

|  | F | G | H | I |
|---|---|---|---|---|
| Smoked Sheet | 100.0 | 100.0 | 100.0 | 100.0 |
| Dihydrazine Sulfate | 0.076 | 0.253 | 0.836 | 2.53 |

|  | J | K | L | M |
|---|---|---|---|---|
| Smoked Sheet | 100.0 | 100.0 | 100.0 | 100.0 |
| Dihydrazine Oxalate | 0.072 | 0.241 | 0.795 | 2.41 |

|  | N | O | P | Q |
|---|---|---|---|---|
| Smoked Sheet | 100.0 | 100.0 | 100.0 | 100.0 |
| Phenylhydrazine | 0.101 | 0.338 | 1.12 | 3.38 |

MOONEY VISCOSITIES—0 HRS. AFTER MIXING

| Parts Pure Hydrazine | Stock | Hydrazine | Stock | Dihydrazine Sulfate | Stock | Dihydrazine Oxalate | Stock | Phenylhydrazine |
|---|---|---|---|---|---|---|---|---|
| 0 | A | 38 | A | 38 | A | 38 | A | 38 |
| 0.03 | B | 48 | F | 63.5 | J | 56.5 | N | 35.5 |
| 0.1 | C | 62 | G | 55 | K | 53.5 | O | 22 |
| 0.33 | D | 40.5 | H | 51.5 | L | 52.5 | P | 14 |
| 1.0 | E | 39 | I | 52 | M | 51.5 | Q | 11 |

MOONEY VISCOSITIES—24 HRS. AFTER MIXING

| Parts Pure Hydrazine | Stock | Hydrazine | Stock | Dihydrazine Sulfate | Stock | Dihydrazine Oxalate | Stock | Phenylhydrazine |
|---|---|---|---|---|---|---|---|---|
| 0 | A | 43.5 | A | 43.5 | A | 43.5 | A | 43.5 |
| 0.03 | B | 55 | F | 92 | J | 90 | N | 39.5 |
| 0.1 | C | 72 | G | 88 | K | 77 | O | 29.5 |
| 0.33 | D | 45.5 | H | 72 | L | 76.5 | P | 13.5 |
| 1.0 | E | 48 | I | 75 | M | 67.5 | Q | 9.5 |

From the foregoing data and from Fig. 1 of the drawings it will be seen that the stiffening action of anhydrous hydrazine reached a peak somewhere in the vicinity of 0.1 part. Above this level, the stiffening action was less pronounced and at 1.0 part it exhibited virtually no stiffening action. Dihydrazine sulfate and oxalate both stiffened the stock throughout the range of testing and amounts of the salts which furnished 1.0 part of actual hydrazine caused a considerably higher Mooney viscosity than the blank. Both dihydrazine sulfate and oxalate imparted a considerably greater stiffening action than equivalent amounts of hydrazine itself at all concentrations except in the case of the 0.1 part level immediately after mixing; even in this case, after standing 24 hours the Mooney viscosity of stock C made with hydrazine itself was substantially lower than that of corresponding stocks G and K made with the hydrazine salts. It is particularly noteworthy that in all cases dihydrazine sulfate and oxalate were much more effective stiffeners than hydrazine at the low concentration of 0.03 part of actual hydrazine furnished, their stiffening action being very pronounced at this low level. This is important because it enables the rubber compounder to obtain a greater stiffening action at lower expense. Phenylhydrazine, even in very low concentrations, plasticizes the stock and continues to do so as the concentration is increased.

In practicing our invention the dihydrazine oxalate or sulfate is intimately incorporated with the uncured rubber in the presence or absence of conventional compounding ingredients including fillers, vulcanizing agents, especially sulfur, accelerators of vulcanization, softeners, anti-oxidants, etc. The incorporation of the dihydrazine oxalate or sulfate with the rubber is most conveniently accomplished by simply milling or masticating them together in the conventional manner used in the rubber industry, for example, using an ordinary two-roll open rubber mill or using an internal mixer, such as a Banbury mixer, for a suitable period of time, typically ranging from 2 to 30 minutes, sufficient to give a uniform homogeneous mixture. The stiffening action apparently is facilitated by at least some degree of heat which is most conveniently applied during mastication or milling. The degree of heat generated when the stock is milled on the ordinary open rubber mill is sufficient to expedite the desired stiffening action upon the rubber even though the rubber mill be cooled in the ordinary manner by circulating cold water through the rolls whereby the temperature of the rolls does not exceed 100° F. The temperature to which the stock is heated will typically range from about 100° F. upwardly to any desired temperature. The temperature to which the stock is heated must not be so high as to injure the rubber. An upper limit of 350° F. is generally applicable. Although the application of at least a moderate degree of heat expedites the stiffening action of the dihydrazine oxalate or sulfate, nevertheless exposure of the mixture to room temperature alone will cause the salt to exert a substantial stiffening effect, especially when the mixture is allowed to stand for several hours.

After the dihydrazine oxalate or sulfate has been thoroughly and intimately incorporated into the rubber, which operation is usually completed within a few minutes, the time required for such incorporation varying with the type and size of milling or masticating equipment available, the size of the batch, and other factors, the resulting mixture can be further masticated or can be allowed to remain in the static condition; during such further mastication or during such holding in static condition, the hydrazine salt generally brings about a substantial additional stiffening action upon the rubber. This additional stiffening action is particularly noticeable in the case of maintenance of the stock in static condition. Such additional stiffening upon such stationary holding of the stock is escially advantageous during subsequent processing or handling of the stocks prior to vulcanization because it is achieved at low cost and additionally serves to counteract or prevent sagging or other distortion of the stocks during subsequent processing operations.

The further mastication or static maintenance of the stocks having the stiffening agent intimately incorporated therein can be carried out at temperatures ranging from room temperature upwardly to the point of thermal decomposition of the rubber and for any suitable duration of time. It will be understood that the action of masticating itself causes a substantial softening of the rubber which may take place to such an extent as to result in an over-all softening of the stock during such mastication, although such softening because of mastication is partially counteracted by the stiffening effect of the dihydrazine oxalate or sulfate, so that at the end of mastication the stock is substantially stiffer than it would have been had the hydrazine salt not been present. It will be understood that the principal, if not the sole, purpose of mastication of the stock after the stiffening agent has been intimately incorporated with the rubber will be to effect the incorporation of compounding ingredients not previously incorporated. It will also be understood that mastication of the stock should be discontinued at a point at which the stock has a viscosity or stiffness greater than it would have had in the absence of the stiffening agent so that the benefits of the stiffening action of the latter are obtained during subsequent processing operations. In other words, we limit mastication after incorporation of the dihydrazine oxalate or sulfate so as to avoid "working out" completely the stiffening action thereof.

As has been indicated, the present invention is particularly applicable to natural rubber, neoprene (polychlorobutadiene) and synthetic rubbers which contain at least 25% of combined aliphatic conjugated diolefin, e. g., butadiene or isoprene. Examples of such synthetic rubber to which the invention is particularly applicable include butadiene-styrene rubbery copolymers, rubbery polybutadiene, rubbery polyisoprene and butadiene-acrylonitrile rubbery copolymers. Our experience has indicated that while dihydrazine oxalate and sulfate will stiffen butyl rubber, which can be described generally as a low temperature copolymer of isobutylene and a small amount (usually from 0.5 to 5%) of butadiene or isoprene, it is not ordinarily commercially desirable to stiffen butyl rubber stocks by means of our invention because the low permeability of butyl rubber to the gases liberated by decomposition of the hydrazine salt during processing (including curing) causes such gases to be retained in the final cured article resulting in undesired porosity. Consequently, the use of our stiffening agents in butyl rubber stocks is not recommended.

In practicing the invention, we typically masticate the mixture of the stiffening agent and the rubber, with or without other compounding ingredients, on an open rubber mill or in an internal mixer, e. g., a Banbury mixer, incorporating sulfur and other compounding ingredients at any suitable point in the process, sheet out the resulting mixture, shape and vulcanize. The mixing is often done at temperatures ranging from 150° F. to 300° F. Those skilled in the art will appreciate that the processing is so carried out that the stiffness of the unvulcanized rubber after mastication and incorporation of compounding ingredients in preparation for shaping and vulcanization is substantially greater than it would be were the stiffening agent not employed. It will also be understood that processing and vulcanization are so conducted that the vulcanizate does not occlude any gases which may be liberated as a result of the presence of the stiffening agent. Those skilled in the art will recognize that any such gases can be easily caused to escape so that a non-cellular vulcanized article is obtained. Because the amount of the hydrazine salt used in practicing the invention is extremely small, and because ordinary incorporating and vulcanizing techniques can easily be so adjusted as to make provision for the escape of any small amount of gases liberated by the hydrazine salt, no difficulties in this connection will ordinarily be encountered.

The present invention is particularly applicable in the manufacture of rubber thread which is usually made from an almost pure gum stock, i. e., a stock free from fillers in more than pigmenting amounts. For example, the use of 0.04% of dihydrazine oxalate or sulfate in the manufacture of cut rubber thread, gives an extremely advantageous stiffening effect before vulcanization. The invention can also be advantageously used in the manufacture of ordinary rubber stocks containing considerable proportions of reinforcing or non-reinforcing fillers, e. g., carbon black, clay, titanium dioxide, etc.

The present invention is useful in stiffening stocks which do not contain substantial proportions of carbon black, i. e., the so-called "non-black" stocks. Our discovery of the marked ability of our hydrazine salts to stiffen rubber in the substantial absence of carbon black is highly advantageous since there are many stocks in which the presence of substantial proportions of carbon black is undesirable. Generally speaking, our hydrazine salts show a substantially greater stiffening action in the case of carbon black-containing natural rubber and GR-S stocks than with the corresponding non-black stocks. In the case of butadiene-acrylonitrile rubbery copolymer stocks, however, the stiffening action of our hydrazine salts is substantially greater in the case of the non-black stocks than with the black stocks.

The use of our hydrazine salts as stiffening agents for rubber in accordance with our invention is highly advantageous. They are effective stiffeners in a wide variety of rubber stocks. They are relatively non-pigmenting and non-discoloring and are non-staining to cloth and lacquers. They prevent sagging or distortion of the design of extruded products. They prevent liner marking or flattening of embossed finishes. Their use enables increased re-use of cutting scrap which normally becomes too soft after repeated reprocessing, thereby reducing expense. Their use enables the use of the less expensive soft grades of rubber due to the fact that our hydrazine salts exert a toughening and hardening action upon such types of rubber when in the uncured state. They are effective with a very wide range of vulcanizing agents and accelerators and in fact in almost any uncured rubber stock. Numerous other advantages of our invention will be apparent to those skilled in the art.

The following examples illustrate the invention more fully. All parts are by weight. All Mooney viscosities were measured at 212° F. with the well-known Mooney plastometer in the standard manner.

*Example I*

A rubber masterbatch was prepared in accordance with the following recipe:

| | Parts |
|---|---|
| Rubber smoked sheets natural rubber | 100.0 |
| Carbon black | 45.0 |
| Zinc oxide | 5.0 |
| Pine tar | 3.5 |
| Zinc salts of cocoanut fatty acids | 3.5 |
| Sulfur | 3.0 |
| Mercaptobenzothiazole | 1.0 |
| | 161.0 |

To a portion of the above masterbatch which had been broken down for 17 minutes there was added dihydrazine oxalate in the proportion shown below to form Stock B. Stock A was the control. Both stocks were thoroughly mixed on a 150–160° F. rubber mill and sheeted out. Samples were died out and the Mooney viscosity measured.

| | A | B |
|---|---|---|
| Masterbatch | 161.0 | 161.0 |
| Dihydrazine Oxalate | | 0.25 |
| Mooney Viscosity | 51 | 109 |

*Example II*

The following example illustrates the ability of dihydrazine oxalate to stiffen smoked sheets (in the absence of a filler) when the stock is subjected to ten minutes mastication on a rubber mill at mill roll temperatures of less than 100° F. and at 300° F. The dihydrazine oxalate was incorporated in the following manner; the smoked sheets were first banded on the open rubber mill at the specified temperature; as soon as the rubber had formed a band, the oxalate was added to the band and thoroughly incorporated. The temperature of the stock was probably slightly above 100° F. in the first series of runs because of the heat generated by the mastication. Generally speaking, the time required to intimately incorporate the chemical with the rubber did not exceed 30 seconds of the total 10 minute milling time.

| | F | G | H | I | J |
|---|---|---|---|---|---|
| Smoked Sheets | 100.0 | 100.0 | 100.0 | 100.0 | 100.0 |
| Dihydrazine Oxalate | | 0.1 | 0.25 | 0.5 | 1.0 |

MOONEY VISCOSITIES

| | F | G | H | I | J |
|---|---|---|---|---|---|
| After milling for ten minutes on a cold mill (at less than 100° F.) | 28 | 37 | 38.5 | 40.5 | 36.5 |
| After milling for ten minutes on a 300° F. mill | 79 | 101 | 96 | 94 | 89.5 |

*Example III*

Two masterbatches were mixed in accordance with the following recipes. GR-S was used as the polymer. The effect of dihydrazine oxalate as a stiffening agent is illustrated in the presence of black and non-black fillers:

| | Non-Black Masterbatch, Parts | Black Masterbatch, Parts |
|---|---|---|
| GR-S | 100.0 | 100.0 |
| Zinc Oxide | 3.0 | 3.0 |
| Stearic Acid | 2.0 | 2.0 |
| Titanium Dioxide | 30.0 | |
| Clay | 100.0 | |
| Carbon Black | | 50.0 |
| Process Oil | 5.0 | 8.0 |
| Sulfur | 2.5 | 2.5 |
| Benzothiazyl disulfide (accelerator) | 1.5 | 1.0 |
| Tetramethyl thiuram monosulfide (accelerator) | 0.25 | 0.1 |
| | 244.25 | 166.6 |

The masterbatches were each divided in equal portions and to one portion of each masterbatch was added the stiffening agent in the proportion shown below. All the portions were milled three minutes on a 150–160° F. rubber mill. Mooney viscosities were then run on the milled stocks.

| | L | M | N | O |
|---|---|---|---|---|
| Non-black Masterbatch | 244.25 | 244.25 | | |
| Black Masterbatch | | | 166.6 | 166.6 |
| Dihydrazine Oxalate | | 0.1 | | 0.1 |
| Compounded Mooney Viscosities | 46.5 | 55 | 34.5 | 48 |

It is evident that the dihydrazine oxalate exhibited a greater stiffening effect in the case of the carbon black-containing GR-S stock than in the case of the non-black GR-S stock.

*Example IV*

Smoked sheets were masticated at 300° F. in a laboratory size Banbury mixer for 5, 10 and 15 minutes. In one case the smoked sheets alone were masticated while in a comparative experiment the smoked sheets together with 0.1 part of dihydrazine oxalate per 100 parts of rubber were employed. The Mooney viscosities were determined at the end of the 5, 10 and 15 minute periods. The results were as follows:

| | Smoked Sheets Alone | Smoked Sheets plus 0.1% of Dihydrazine Oxalate |
|---|---|---|
| Initial Mooney Viscosity of Rubber was 98 | | |
| Viscosity after 5 minutes of mastication at 300° F | 83 | 94 |
| Viscosity after 10 minutes of mastication at 300° F | 72 | 87 |
| Viscosity after 15 minutes of mastication at 300° F | 63 | 77 |

The above data (which are plotted in Fig. 2 of the drawings) show the effect of dihydrazine oxalate in preventing excessive softening of uncured rubber during hot processing.

*Example V*

Two commercial types of neoprene, namely, Neoprene RT and Neoprene W were admixed with 0.1 part of dihydrazine oxalate per 100 parts of rubber in the same way as in Example II, on an open rubber mill, the temperature of the mill rolls being 250° F. The following table shows the Mooney viscosity of control samples and of the samples containing the dihydrazine oxalate after different periods of milling at 250° F.

MOONEY VISCOSITIES AFTER MILLING AT 250° F.

|  | Neoprene RT | | Neoprene W | |
|---|---|---|---|---|
| Massed Polymer | 16 | | 42 | |
|  | Blank | +0.1% of dihydrazine oxalate | Blank | +0.1% of dihydrazine oxalate |
| 5'/250° F. Milling | 14 | 18.5 | 41.5 | 52 |
| 10'/250° F. Milling | 12 | 20.0 | 36 | 57.5 |
| 15'/250° F. Milling | 15.5 | 23.5 | 34 | 62.5 |

*Example VI*

In the same way as in Example V the stiffening action of dihydrazine oxalate was tested in both regular GR–S and in so-called "cold" GR–S (X–478), the milling being done at 250° F. The following data were obtained:

MOONEY VISCOSITIES AFTER MILLING AT 250° F.

|  | Regular GR-S | | "Cold" GR-S (X-478) | |
|---|---|---|---|---|
| Massed Polymer | 55 | | 49 | |
|  | Blank | +0.1% of dihydrazine oxalate | Blank | +0.1% of dihydrazine oxalate |
| 5'/250° F. Milling | 48.5 | 56 | 49 | 52 |
| 10'/250° F. Milling | 40 | 49 | 46 | 50 |
| 15'/250° F. Milling | 32 | 45 | 46 | 50 |

*Example VII*

In the same way as in Examples V and VI, the stiffening action of dihydrazine oxalate upon rubbery butadiene-acrylonitrile copolymers was determined. Two commonly used butadiene-acrylonitrile copolymers identified as "A" and "B" were used. The following data were obtained:

MOONEY VISCOSITIES AFTER MILLING AT 250° F.

|  | Butadiene-Acrylonitrile Copolymer "A" | | Butadiene-Acrylonitrile Copolymer "B" | |
|---|---|---|---|---|
| Massed Polymer | 92 | | 78 | |
|  | Blank | +0.1% of dihydrazine oxalate | Blank | +0.1% of dihydrazine oxalate |
| 5'/250° F. Milling | 99 | 102 | 74 | 85 |
| 10'/250° F. Milling | 103 | 103 | 65 | 77.5 |
| 15'/250° F. Milling | 110.5 | 121 | 61 | 68 |

*Example VIII*

Non-black and carbon black-containing butadiene-acrylonitrile copolymer stocks, with and without 0.1% of dihydrazine oxalate based on the copolymer, were mixed in the laboratory Banbury mixer. Copolymer "A" (as used in Example VII) was employed. The following Mooney viscosity data show a greater stiffening effect for dihydrazine oxalate in filler-containing stocks than when used in the copolymer only (as in Example VII). The dihydrazine oxalate was also more effective in the non-black stock than it was in the black stock which was reinforced with a furnace type of carbon black (known as HMF). The data were as follows:

MOONEY VISCOSITY ON BANBURY MIXED BUTADIENE-ACRYLONITRILE POLYMER STOCKS

| Non-black Stock | | Black Stock | |
|---|---|---|---|
| Blank | +0.1% of dihydrazine oxalate | Blank | +0.1% of dihydrazine oxalate |
| 76.5 | 124 | 87 | 106 |

*Example IX*

To separate portions of a natural rubber masterbatch made with smoked sheets according to the formulation given in Example I, varying amounts of dihydrazine oxalate were incorporated in the same manner as in Example I. The Mooney viscosities of samples of the mixes were determined. Samples were cured 45 minutes at 30 lbs. steam pressure. The data on these experiments were as follows:

|  | P | Q | R | S |
|---|---|---|---|---|
| Natural Rubber Masterbatch | 161.0 | 161.0 | 161.0 | 161.0 |
| Dihydrazine Oxalate | 0 | 0.1 | 0.25 | 0.5 |
| Mooney Viscosites of Uncured Stocks | 43 | 73 | 83 | 93 |

UNAGED TENSILE PROPERTIES OF VULCANIZATES, P.S.I.

|  | P | Q | R | S |
|---|---|---|---|---|
| 300% | 1,240 | 1,500 | 1,560 | 1,610 |
| 500% | 2,930 | 3,390 | 3,570 | 3,720 |
| Tensile | 4,390 | 4,670 | 4,860 | 4,690 |
| Elong | 645 | 623 | 630 | 580 |
| T-50 of Vulcanizates at 350% | −1.6 | −2.8 | −5.6 | −6.4 |

The effect of increasing amounts of dihydrazine oxalate in increasing the viscosity or reducing the plasticity of the stocks is readily apparent. It will also be seen that the physical properties of the vulcanizates obtained from the stocks containing dihydrazine oxalate are not adversely affected by the dihydrazine oxalate.

*Example X*

In the following hot air and hot air-ammonia cured footwear stocks, the marked ability of dihydrazine oxalate to firm the stocks (thereby reducing marking and pressing) and to retard the breakdown of the stocks (thereby allowing the use of reworkable scrap in repeated calenderings) is illustrated. Only a very small amount (0.1%) of dihydrazine oxalate is needed to accomplish this stiffening effect. There were first prepared two masterbatches having the following formulations:

|  | Masterbatches | |
|---|---|---|
|  | Hot Air Cured | Hot Air-Ammonia Cured |
| Smoked Sheets | 100.0 | 100.0 |
| Zinc Oxide | 6.0 | 6.0 |
| Natural Whiting | 47.0 | 47.0 |
| Carbon Black | 5.0 | 5.0 |
| Mercaptobenzothiazole | 1.25 |  |
| Benzothiazyl Disulfide |  | 0.40 |
| Tetramethylthiuram Monosulfide | 0.125 | 0.02 |
| Sulfur | 1.65 | 1.65 |
|  | 161.025 | 160.07 |

These masterbatches were mixed with dihydrazine oxalate in the proportions shown in the following table. The method of incorporation was the same as in Example I. The Mooney viscosities of the resulting mixtures were determined. Samples were cured by being raised to a temperature of 260° F. over 30 minutes followed by holding at that temperature for 40 minutes. The data on the uncured stocks and on the vulcanizates were as follows:

| Hot Air Cured Masterbatch | 161.025 | 161.025 | 161.025 | | | |
| Hot Air-Ammonia Cured Masterbatch | | | | 160.07 | 160.07 | 160.07 |
| Dihydrazine Oxalate | 0 | 0.1 | 1.0 | 0 | 0.1 | 1.0 |

MOONEY VISCOSITIES

| Calendered Stock | 48 | 63 | 68 | 51 | 62.5 | 62.5 |
| Resheeted Stock | 45.5 | 58.5 | 62 | 48.5 | 57 | 60 |

MOONEY SCORCH AT 250° F.

| 3 Point Rise Above Minimum feet | 10¼ | 9 | 5¼ | 38½ | 26 | 10 |
| 23 Point Rise Above Minimum feet | 2 | 1¾ | ¾ | 8½ | 12½ | 2 |

UNAGED TENSILE PROPERTIES, P. S. I.

| 300% | 400 | 420 | 420 | 470 | 470 | 410 |
| 500% | 1,030 | 1,075 | 1,150 | 1,330 | 1,330 | 1,250 |
| Tensile | 2,740 | 2,930 | 2,930 | 2,690 | 2,720 | 2,290 |
| Elong | 713 | 703 | 695 | 680 | 660 | 625 |
| T-50 at 500% | −12.0 | −11.6 | −11.2 | −1.4 | −1.8 | −1.6 |

It will be seen that in these stocks the stiffening effect of 0.1% of dihydrazine oxalate is very pronounced and is almost as great as that of 1.0% of the oxalate.

*Example XI*

The ability of dihydrazine oxalate to firm up stocks was further demonstrated by placing a raw calendered blank control stock and an identical stock into which had been milled 0.1 part of dihydrazine oxalate per 100 parts of rubber between pieces of heavy duck liner, placing a kilogram weight on the top of the pile and allowing to stand overnight. At the end of the test period it was noted that the stock which contained the dihydrazine oxalate had been liner marked or pressed to a much lesser degree than the blank control. The same effects will be noted with 0.1 part of dihydrazine sulfate.

In the following examples, numbered XII to XVII, we used dihydrazine sulfate in the form of a commercial preparation containing 26.4% of dihydrazine sulfate and 73.6% of talc which served as a carrier. The values given in these examples represent the actual dihydrazine sulfate content employed. The amount of talc so introduced into the rubber stocks was so small as to be negligible and is not reported.

*Example XII*

Smoked sheet natural rubber was milled on an open rubber mill at 300° F. in the presence and absence of approximately 0.1 part of dihydrazine sulfate per 100 parts of rubber polymer. The Mooney viscosities at 212° F. were measured at intervals during the hot milling. The data were as follows:

MOONEY VISCOSITIES AT 212° F.—HOT MILLED AT 300° F.

| Stock | A | B |
|---|---|---|
| | Blank Control | 0.1% dihydrazine sulfate |
| Milling Time, minutes: | | |
| 5 | 58 | 73 |
| 10 | 42 | 51 |
| 15 | 33 | 38.5 |

The improvement over the blank control due to the presence of the dihydrazine sulfate is apparent and substantial.

*Example XIII*

This example demonstrates the use of dihydrazine sulfate in regular GR–S and in so-called "cold" GR–S (X–478). In line with Example VI above, the stiffening agent is more effective in the regular GR–S than in the "cold" GR–S. This is probably due to the resistance to break-down of the latter on a hot mill.

In this example the GR–S polymers were milled on the open rubber mill at 250° F. for times ranging up to 15 minutes in the presence and absence of approximately 0.1 part of dihydrazine sulfate per 100 parts of polymer. The data were as follows:

MOONEY VISCOSITIES AFTER MILLING AT 250° F.

| Stock | A | B | C | D |
|---|---|---|---|---|
| | Regular GR–S | | "Cold" GR–S | |
| | Blank | +0.1% of Dihydrazine Sulfate | Blank | +0.1% of Dihydrazine Sulfate |
| Milling Time, Minutes: | | | | |
| 5 | 42 | 52 | 64 | 64 |
| 10 | 32 | 46 | 60 | 61.5 |
| 15 | 26.5 | 43 | 58.5 | 60.5 |

*Example XIV*

In this example the stiffening action of dihydrazine sulfate on two types of neoprene undergoing hot milling at 250° F. was measured. The data follow:

MOONEY VISCOSITIES AFTER MILLING AT 250° F.

| Stock | A | B | C | D |
|---|---|---|---|---|
| | Neoprene GN–A | | Neoprene W | |
| | Blank | +0.1% of Dihydrazine Sulfate | Blank | +0.1% of Dihydrazine Sulfate |
| Milling Time, Minutes: | | | | |
| 5 | 32 | 40 | 43 | 51.5 |
| 10 | 28 | 40 | 39 | 57.5 |
| 15 | 25 | 40.5 | 37 | 61.5 |

*Example XV*

The stiffening effect of dihydrazine sulfate upon butadiene-acrylonitrile rubbery copolymers undergoing hot milling at 250° F. was measured. The data follows:

MOONEY VISCOSITIES AFTER MILLING AT 250° F.

| Stock | A | B | C | D |
|---|---|---|---|---|
| | Nitrile Rubber A | | Nitrile Rubber B ("Paracril") | |
| | Blank | +0.1% of Dihydrazine Sulfate | Blank | +0.1% of Dihydrazine Sulfate |
| Milling Time, Minutes: | | | | |
| 5 | 115 | 127 | 82 | 105 |
| 10 | 111 | 125 | 75 | 101 |
| 15 | 111 | 123 | 72 | 91 |

*Example XVI*

The stiffening action of dihydrazine sulfate in a natural rubber tread stock with a high carbon black loading was demonstrated in this example. The amount of dihydrazine sulfate ranged from approximately 0.05 to approximately 0.2 part per 100 parts of rubber. It will be noted from the data that almost maximum stiffening effect occurred with only 0.1 part of this chemical.

The base formula was as follows:

| | Parts |
|---|---|
| Smoked sheet | 100.0 |
| Medium processing channel black | 45.0 |
| Zinc oxide | 5.0 |
| Pine tar | 3.5 |
| Zinc salts of coccoanut oil fatty acids | 3.5 |
| Mercaptobenzothiazole | 1.0 |
| Sulfur | 3.0 |
| Total | 161.0 |

With separate portions of the above base stock there were intimately incorporated varying amounts of dihydrazine sulfate in the same way as in Example I. The data were as follows:

| | A | B | C | D | E |
|---|---|---|---|---|---|
| Above Base Stock | 161.0 | 161.0 | 161.0 | 161.0 | 161.0 |
| Dihydrazine Sulfate | | 0.05 | 0.1 | 0.15 | 0.2 |
| Mooney Viscosities of Uncured Stock | 62 | 80 | 92 | 94 | 94.5 |

UNAGED PROPERTIES (P. S. I.) OF VULCANIZATES (CURED 45' AT 274° F.)

| | A | B | C | D | E |
|---|---|---|---|---|---|
| 300% Modulus | 940 | 990 | 1,040 | 1,000 | 1,100 |
| 500% Modulus | 2,370 | 2,450 | 2,590 | 2,530 | 2,730 |
| Break | 4,150–690 | 4,370–710 | 4,400–700 | 4,260–700 | 4,330–680 |
| T–50 at 350% | +0.2 | –1.6 | –1.2 | –1.0 | –1.4 |

Example XVII

The stiffening effect of approximately 0.1% (based on rubber) of dihydrazine sulfate in natural rubber footwear stocks essentially the same as those discribed in Example X above was determined, using typical hot air and hot air-ammonia cured stocks. The addition of this small amount of dihydrazine sulfate firmed up these stocks sufficiently to eliminate most of the processing difficulties. Thus, the adverse softening effect of working high percentages of raw scrap back into new mixtures, resulting in unduly soft, calendered stocks which blister and liner mark, is easily overcome.

This application is a continuation-in-part of our co-pending application Serial No. 220,539, filed April 11, 1951.

Having thus described our invention, what we claim and desire to protect by Letters Patent is:

1. The method which comprises milling into an unvulcanized rubber stock which is in process and has an objectionably low viscosity for satisfactory handling in factory operations, the rubber in said stock being selected from the group consisting of natural rubber, rubbery butadiene-styrene copolymers, rubbery butadiene-acrylonitrile copolymers, and polychloroprene, a salt selected from the group consisting of dihydrazine oxalate and dihydrazine sulfate in an amount containing from 0.01 to 0.1 part of actual hydrazine per 100 parts of said rubber, exposing the mixture to a temperature ranging from room temperature to a temperature just below that at which thermal injury to said rubber would occur and thereby causing said salt to act upon said stock in such a way as to impart thereto a considerably increased stiffness, at some point incorporating in the stock vulcanizing and other conventional compounding ingredients, limiting mastication after incorporation of said salt to such an extent that the stiffening effect of said salt is retained to a material extent and the resulting mixture is considerably stiffer than it would have been if made in the same way but without the use of said salt, and vulcanizing the resulting mixture.

2. The method which comprises milling into an unvulcanized rubber stock which is in process and has an objectionably low viscosity for satisfactory handling in factory operations, the rubber in said stock being selected from the group consisting of natural rubber, rubbery butadiene-styrene copolymers, rubbery butadiene-acrylonitrile copolymers, and polychloroprene, dihydrazine oxalate in an amount containing from 0.01 to 0.1 part of actual hydrazine per 100 parts of said rubber, exposing the mixture to a temperature ranging from room temperature to a temperature just below that at which thermal injury to said rubber would occur and thereby causing said dihydrazine oxalate to act upon said stock in such a way as to impart thereto a considerably increased stiffness, at some point incorporating in the stock vulcanizing and other conventional compounding ingredients, limiting mastication after incorporation of said dihydrazine oxalate to such an extent that the stiffening effect of said dihydrazine oxalate is retained to a material extent and the resulting mixture is considerably stiffer than it would have been if made in the same way but without the use of said dihydrazine oxalate, and vulcanizing the resulting mixture.

3. The method which comprises milling into an unvulcanized rubber stock which is in process and has an objectionably low viscosity for satisfactory handling in factory operations, the rubber in said stock being selected from the group consisting of natural rubber, rubbery butadiene-styrene copolymers, rubbery butadiene-acrylonitrile copolymers, and polychloroprene, dihydrazine sulfate in an amount containing from 0.01 to 0.1 part of actual hydrazine per 100 parts of said rubber, exposing the mixture to a temperature ranging from room temperature to a temperature just below that at which thermal injury to said rubber would occur and thereby causing said dihydrazine sulfate to act upon said stock in such a way as to impart thereto a considerably increased stiffness, at some point incorporating in the stock vulcanizing and other conventional compounding ingredients, limiting mastication after incorporation of said dihydrazine sulfate to such an extent that the stiffening effect of said dihydrazine oxalate is retained to a material extent and the resulting mixture is considerably stiffer than it would have been if made in the same way but without the use of said dihydrazine sulfate, and vulcanizing the resulting mixture.

References Cited in the file of this patent

UNITED STATES PATENTS

| | | |
|---|---|---|
| 2,136,373 | Busse | Nov. 15, 1938 |
| 2,315,850 | Gerke | Apr. 6, 1943 |